Oct. 18, 1960  T. L. McKAY ET AL  2,956,293
METHOD OF AND APPARATUS FOR FABRICATING
SELF-LOCKING THREADED FASTENING MEMBERS
Filed April 3, 1958  3 Sheets-Sheet 1
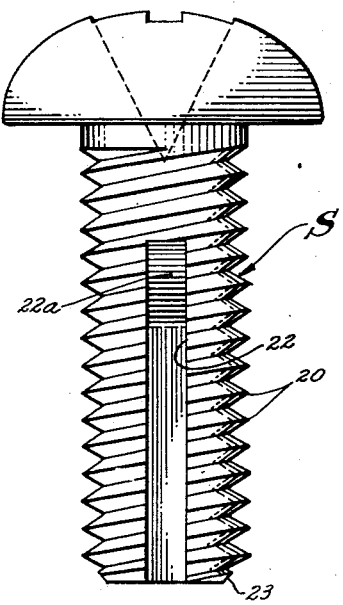
Fig.1
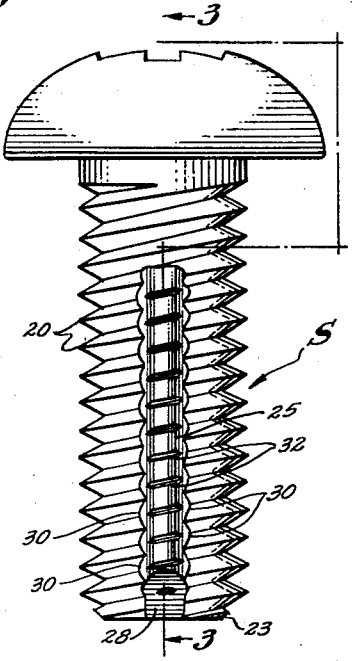
Fig.2
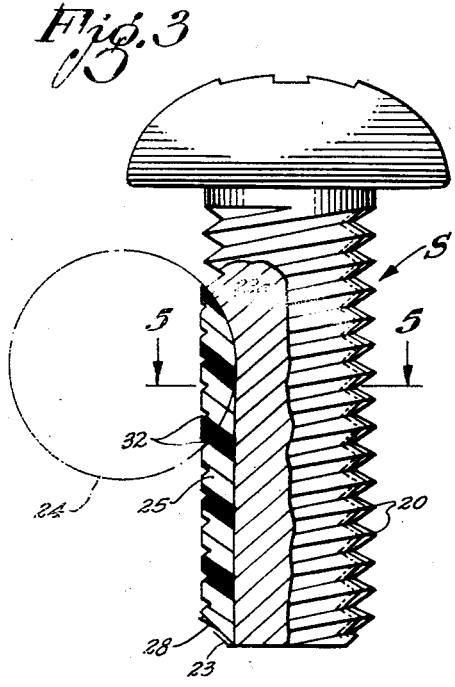
Fig.3
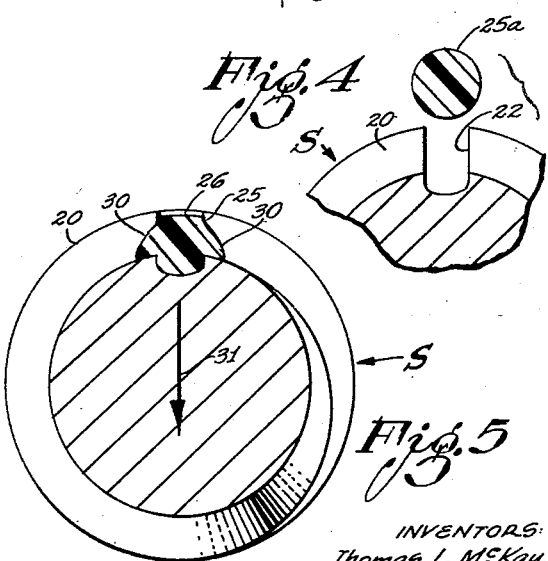
Fig.4
Fig.5
INVENTORS:
Thomas L. McKay,
Harold LeRoy Oliver,
Robin J. Starrett
By Smyth & Roston
Attorneys Oct. 18, 1960 T. L. McKAY ET AL 2,956,293
METHOD OF AND APPARATUS FOR FABRICATING
SELF-LOCKING THREADED FASTENING MEMBERS
Filed April 3, 1958 3 Sheets-Sheet 2

INVENTORS:
Thomas L. McKay
Harold LeRoy Oliver
Robin J. Starrett

By Smyth & Roston
Attorneys

Oct. 18, 1960  T. L. McKAY ET AL  2,956,293
METHOD OF AND APPARATUS FOR FABRICATING
SELF-LOCKING THREADED FASTENING MEMBERS
Filed April 3, 1958  3 Sheets-Sheet 3
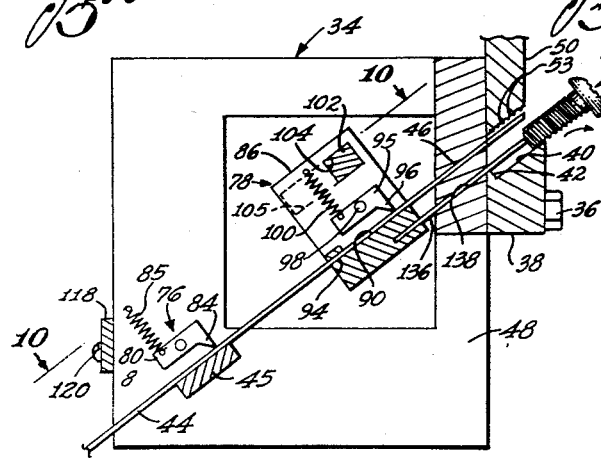
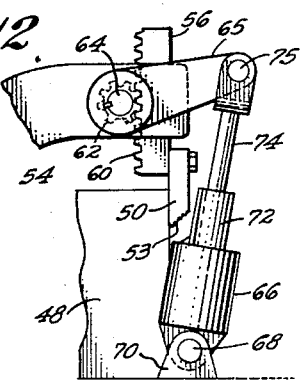
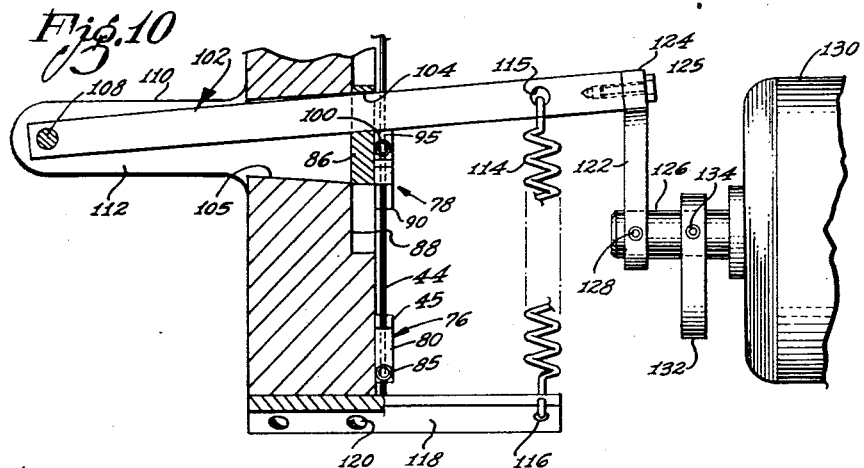
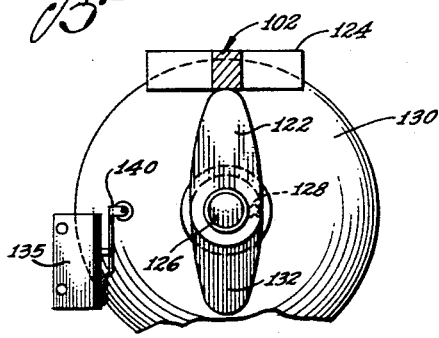
INVENTORS:
Thomas L. McKay
Harold LeRoy Oliver
Robin J. Starriett
Attorneys

United States Patent Office 2,956,293
Patented Oct. 18, 1960

2,956,293

METHOD OF AND APPARATUS FOR FABRICATING SELF-LOCKING THREADED FASTENING MEMBERS

Thomas L. McKay and Harold L. Oliver, Los Angeles, and Robin J. Starriett, Encino, Calif., assignors to Long-Lok Corporation, Santa Monica, Calif., a corporation of California Filed Apr. 3, 1958, Ser. No. 726,229

6 Claims. (Cl. 10—2)

This invention relates to an apparatus for fabricating self-locking threaded fastening members and, more particularly, is directed to the problem of installing a locking insert in a groove in a threaded fastening member. This application is a continuation-in-part of our copending application, Serial No. 528,994, filed August 17, 1955, entitled Self-Locking Screw and Method and Apparatus for Forming Same, now abandoned.

The type of self-locking threaded fastening member to which the invention pertains has a generally longitudinal groove cutting across the turns of its screw thread, in which groove is seated an insert body of correspondingly elongated configuration. The insert body is deformable by the complementary screw thread of a cooperating fastening member, and the deformation of the insert body by the complementary screw thread results in the desired self-locking action.

One factor in the self-locking action of the fastening member is the axial thrust of the two fastening members in opposite directions in reaction to the deformation of the insert body by the complementary screw thread, the frictional areas under pressure from these opposite axial thrusts extending spirally for as many turns of the two screw threads as are mutually engaged with each other. A second factor is the lateral thrust of the two fastening members against each other in reaction to the deforming engagement of the complementary screw thread with the deformable insert. There is also a third frictional locking effect in the pressure contact between the insert body itself and the impinging screw thread of the complementary fastening member.

By way of example and to illustrate the principles involved, the invention is described herein as applied to the construction of a fastening member in the form of a screw having a screw thread, the turns of which are intersected by the groove in which the insert body seats. It is to be understood, however, that the principles of the invention are equally applicable to the construction of a fastening member such as a nut having an internal screw thread, the turns of which are intercepted by a groove in which the insert seats.

In the preferred practice of the invention for fabricating a self-locking screw, the longitudinal groove extends from the tapered leading end of the screw towards the head of the screw and terminates short of the head. If desired, however, the groove may extend from a point short of the leading end of the screw.

The fabrication problem is to provide a screw with a longitudinal groove, to provide an elongated insert body suitably dimensioned to be used in the groove, and to install the insert body in the groove. All of these steps should be carried out economically and in such manner as to cause the insert to be retained in the groove until the screw is actually used.

A feature of the preferred practice of the invention is the use of a milling cutter to cut the groove, the milling cutter rotating in a plane that is generally longitudinally of the screw so that the blind end of the groove is tapered.

A further feature is the severing of successive insert bodies from a length of stock material by slicing off the stock at an angle that corresponds to this taper. Thus, each slicing operation on the length of stock material forms a tapered end of one insert body and an oppositely tapered end of the next succeeding insert body from the length of stock.

Another problem is to carry out in an efficient and time-saving manner the steps of slicing off the insert bodies and of seating the insert bodies in the screw grooves. In general, this problem is met by slicing off an insert body by a cutting stroke of a suitable cutting tool and using the same stroke of the cutting tool to force the insert body into the screw groove. For this purpose, the screw with the groove therein is placed in proper orientation across the path of the cutting tool, and the cutting tool is shaped as means to press the severed insert body into the screw groove. In one practice of the invention, the insert body is forced into the groove with sufficient force to deform the insert body into interlocking engagement with the turns of the screw thread along the sides of the groove.

In some practices of the invention, it is desirable to preform the insert body in the sense of partially deforming the insert body in advance to approach, but not achieve, the actual configuration that the insert body ultimately takes under impingement by the complementary screw thread of the nut or other female threaded member that is used with the screw. In this regard, a further feature of the invention is the provision of a cutting tool that has a serrated surface for pressure against the severed insert body so that the cutting tool in one stroke not only severs the insert body and seats the insert body in the screw groove, but also preforms the insert body to the desired degree.

The various features and advantages of the invention may be understood by reference to the following detailed description and the accompanying drawings.

In the drawings, which are to be regarded as merely illustrative:

Fig. 1 is a side elevational view of a self-locking screw embodying a selected practice of the invention, the view showing the longitudinal groove without the insert body;

Fig. 2 is a similar view with the preformed insert body in the groove;

Fig. 3 is a view of the finished screw, partly in elevation and partly in section, with the section taken as indicated by the line 3—3 of Fig. 2;

Fig. 4 is a fragmentary transverse sectional view showing the relationship between the cross section of the groove and the cross section of the blank insert;

Fig. 5 is a transverse section of the finished groove taken as indicated by the line 5—5 of Fig. 3;

Fig. 9 is a fragmentary view of the apparatus similar to Fig. 6, showing the manner in which a finished self-locking screw is ejected from the apparatus with simultaneous advance of the length of insert material for the next successive screw;

Fig. 10 is an enlarged fragmentary section taken as indicated by the line 10—10 of Fig. 9, showing the actuating means for the mechanism of Fig. 9;

Fig. 11 is a transverse section taken as indicated by the line 11—11 of Fig. 10, showing a cam arrangement in the actuating mechanism; and Fig. 12 is a fragmentary view in side elevation of a second actuating means incorporated in the apparatus for generating the force to seat the insert blank and simultaneously to deform the blank to the desired configuration.

Figure 6:
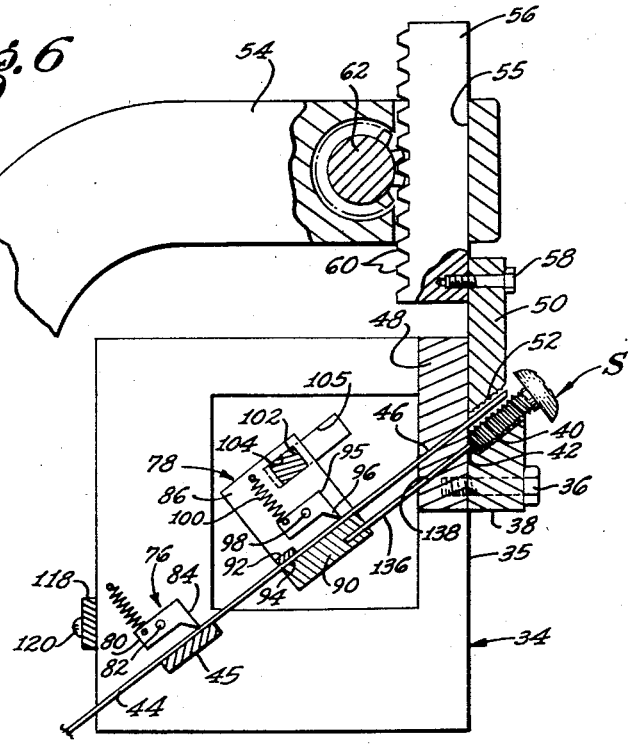
Fig. 6 is a fragmentary view of the presently preferred form of apparatus for practicing the method of the invention, the view being partly in side elevation and partly in section.

Figs. 1–5 show how the invention may be applied to the fabrication of a well-known type of screw, generally designated by the letter S, the shank of the screw being formed with a conventional screw thread 20. In accord with the invention, a slot or groove 22 is cut or formed longitudinally in the shank of the screw. Such a groove may be of any length and may be formed in various ways in various practices of the invention.

In this particular practice of the invention, the groove 22 extends to and opens on the leading end of the screw shank, which leading end has a taper or chamfer 23. In this instance, the groove 22 is cut in the screw shank by means of a side milling cutter which is indicated in phantom at 24 in Fig. 3. The milling cutter 24 rotates in a plane that is substantially parallel with the axis of the screw shank and is advanced inwardly from the leading end of the screw to provide a groove of the desired length. The use of a side milling cutter in this manner results in the groove 22 having a tapered end 22a that is curved in accord with the configuration of the milling cutter 24. The groove 22 is relatively narrow and relatively shallow and, therefore, does not materially weaken the screw.

In accord with the invention, a suitable insert body 25 is seated in the groove 22 longitudinally thereof. Such an insert may be made of various materials for various purposes. Thus, the insert body 25 may be made of suitable plastic materials for service at lower moderate temperatures and may be made of suitable metals for high temperature conditions. The plastics that may be employed include various types of nylon and such plastics as those sold under the trade name Kel-F. For high temperature use, the insert material may be soft copper, for example, or stainless steel tubing.

As shown in Fig. 3, preferably the inner end of the insert 25 is cut with a flat taper to conform to the tapered inner end 22a of the groove 22 in the sense that the flat insert taper corresponds generally to the chord of the arc of the groove surface 22a so that the tapered end of the insert substantially fills the tapered end of the groove. In this regard, one feature of the invention is that the other outer end of the insert 25 has an identical flat tapered surface 28 that is parallel with the first mentioned tapered surface, both tapered surfaces at the ends of the insert being inclined at the same angle relative to the longitudinal axis of the insert. As may be seen in Fig. 3, the tapered surface 28 forms a leading nose for the insert that is inside the taper or chamfer 23 of the screw end, this configuration of the insert facilitating initial engagement of the screw with a threaded female member such as a conventional nut.

Various techniques may be employed to anchor the insert in the groove permanently and in a manner that prevents longitudinal movement or creepage of the insert in response to the advance of the female thread of the nut or like member that is used with the screw. For example, suitable adhesive material may be used to bond the insert to the bottom of the groove or furnace brazing may be used to anchor a metal insert. In some practices of the invention, an oversize insert, i.e., an insert of greater width than the groove 22, is forced into the groove in a manner that causes the insert to be mechanically locked in place. In other practices of the invention, a deformable insert body of a width to fit easily into the groove is placed in the groove and is then deformed by pressure or impact in such manner as to result in permanent anchorage of the insert both against withdrawal from the groove and against longitudinal movement in the groove.

Fig. 4 shows how a plastic insert body of round cross-sectional configuration and of larger diameter than the groove 22 may be positioned for insertion in the groove. Fig. 5 shows how such an insert is deformed when it is forced into the groove.

It can be seen in Fig. 5 that the insert completely fills the groove 22 and extends radially outward approximately to the outer circumference of the crest of the screw thread 29. In addition to filling the groove 22 completely, the insert 25 has marginal portions 30 that protrude laterally into engagement with the valleys of the turns of the screw thread 20 at multiple spaced points on each side of the groove. Thus, the marginal protruding portions 30 form multiple pairs of anchorages to retain the insert 25 against longitudinal bodily movement or shift relative to the groove 22.

When the screw S is threaded into a female element such as a nut, the penetration of the female screw thread into the material of the insert 25 at longitudinally spaced points of the insert tends to shift the insert longitudinally in the groove 22 towards the head of the screw but the multiple anchorages provided by the marginal portions 30 prevent such longitudinal shift. The female thread of any nut with which the screw may be engaged extends into the valleys of the male thread of the screw and since there is a pair of marginal portions 30 of the insert in each valley, the female thread causes local resilient longitudinal distortion of the insert in the region of each valley with marginal portions of the insert extending into the same valley to resist the resilient distortion. As a result, the female thread creates a cumulative longitudinal reaction thrust by the plastic insert 25 which is transmitted to the screw S and causes the male thread 20 to thrust axially against the female thread. Since a plurality of complete turns of both threads are involved, this axial reaction thrust involves the pressure engagement of a relatively large total area of thread surfaces.

Since the plastic insert 25 completely fills the groove 22 and extends outward into the radial zone of the thread 20, the insertion of the screw S into a female member with consequent radially inward resilient deformation of the insert creates a lateral diametrical reaction thrust as indicated by the arrow 31 in Fig. 5. This sidewise thrust of the screw S presses the male thread 20 against the surrounding female thread throughout a longitudinal zone that is diametrically opposite from the longitudinal zone of the insert 25.

It is readily apparent that the above described axial reaction thrust of the screw together with the described lateral reaction thrust creates effective frictional engagement between the thread 20 of the screw and the surrounding female thread to lock the screw frictionally against loosening or retraction from the female member into which it is inserted. In addition, of course, the pressural engagement of the elastically deformed insert 25 with the threads of the female member further resists loosening rotation of the screw S.

Since the insert 25 is anchored in the groove 22 against radial withdrawal by lateral pressure contact with the side walls of the groove and since the insert is held against longitudinal bodily shift in the groove by the anchoring marginal portions 30, the insert may be substantially shorter than the groove. A further feature of the invention in this regard is that the inner end of the insert 25 need not abut the end 22a of the groove.

A further feature of this particular practice of the invention is that the operation of forcing the plastic insert 25 into the groove 22 is utilized to partially preform the insert in the sense of giving the outer exposed surface of the insert a serrated configuration that approaches, but does not quite match, the configuration to which the insert will be ultimately deformed by the female thread of a cooperating nut or the like. Thus, the insert body 25 may be partially preformed to the extent of having a series of longitudinally spaced transverse indentations 32 that correspond to the deeper indentations that will be formed ultimately by the cooperating female thread.

With the reference to anchorage of an insert body against longitudinal movement or shift in such a groove 22, there is a special advantage in employing an insert of greater than the width of the groove with the groove and insert of such dimensions in cross section that the widest portion of the insert is not forced inward beyond the root diameter of the screw thread. This advantage resides in the fact that forcing an oversize insert past the cut ends of the turns of the screw thread along the two sides of the groove causes the thread ends to gouge out or displace corresponding portions of the insert at longitudinally spaced points along the opposite sides of the insert. In other words, the cut ends of the thread along the two sides of the groove 22 serve as teeth to bite into the insert with consequent positive engagement therewith that interlocks the insert with the screw in a manner to prevent longitudinal shift in the groove.

This positive engagement at spaced points may be destroyed if the insert is forced inward past the root diameter of the screw to such extent as to disengage the insert from the cut end of the thread, but it is a simple matter to dimension the insert and the groove in such manner as to result in the desired interengagement. In general, the dimensional relationships for a metal insert for engagement by the thread ends will differ from the dimensional relationships for a plastic insert because metals are usually less easily deformed than plastic materials. Metal inserts usually function best when they extend outward only to the pitch diameter of the screw instead of extending outward to the diameter of the crest of the screw thread. Thus, for a given screw, a metal insert extending outward to the pitch diameter will be of smaller diameter than a plastic insert that extends outward to the crest diameter.

In Fig. 5 illustrating the use of a plastic insert, the groove 22 has a width of .040"±.001 and the bottom wall 32 of the groove is curved circumferentially at a radius of curvature of .030". The groove extends, of course, to the outer circumference of the thread of the screw S and the depth of the groove measured to the center of its curved bottom is .048"±.002. The blank insert body 25a is a solid cylinder having a diameter of .048"±.002.

With these dimensional relationships, the diameter of the insert blank 25a is approximately 20% greater than the width of the slot 22 to insure substantial lateral compression of the insert material by the slot. Also, by virtue of these dimensional relationships, the cross-sectional area of the blank insert 25a is approximately 10% greater than the cross-sectional area of the groove 22 so that when the insert blank is forced into the groove there is enough surplus insert material to form the desired multiple marginal protuberances 30. When the blank insert 25a is inserted into the groove 22 with sufficient force to exceed the elastic limits of the plastic material and thus deform the plastic material permanently, the insert is automatically molded to the desired configuration by the screw slot and the adjacent portions of the screw thread 20.

The above recited dimensional relationships which are shown in Figs. 4 and 5 also result in the screw thread ends along the groove 22 cutting or gouging the sides of the insert at longitudinally spaced points. The result from this effect alone is positive interlocking of the insert with the thread ends to anchor the insert in a positive manner against longitudinal shift in the groove.

The force applied for this purpose of seating and shaping the blank insert may be more or less gradually applied pressure. In the preferred practice of the invention, however, the required seating and shaping pressure is applied abruptly by impact means.

The preferred method wherein a blank 25a is seated and deformed by impact force may be carried out by the apparatus shown in Figs. 6 to 12. This apparatus includes an upright support structure, generally designated by the numeral 34, which has a flat front face 35.

Figure 7:
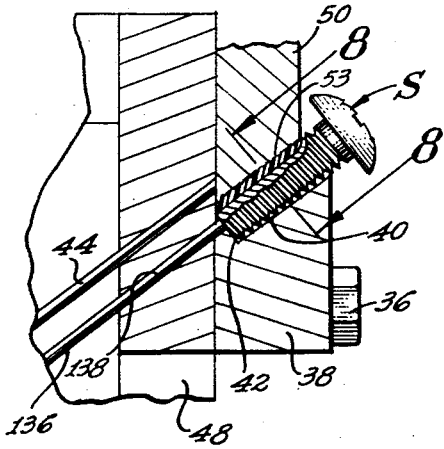
Fig. 7 is an enlarged fragmentary view similar to Fig. 6, showing the parts of the apparatus as positioned at the end of the operation of forcing an insert into the groove of the screw.
Figure 8:
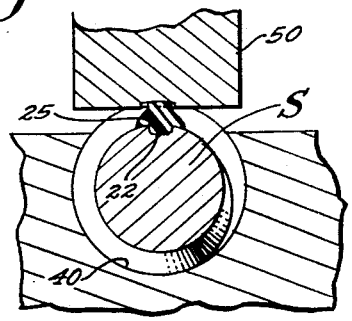
Fig. 8 is a cross-sectional view on a larger scale taken as indicated by line 8—8 of Fig. 7.

Mounted on the front face 35 by suitable screw means 36 is a metal block 38 having a suitably inclined recess 40 on its upper side to serve as a seat for the successive screws S that are to be processed. The longitudinal axis of this seat 40 is inclined as shown with the angle of inclination relative to the front face 35 equaling the angle of inclination of the previously mentioned tapered surfaces 26 and 28 of the finished insert relative to the longitudinal axis of the insert. This recess or seat 40 may be of semicylindrical configuration with an end wall 42 for abutment by the leading end of the screw S as shown in Figs. 6 and 7. The seat and the space immediately comprise the processing zone in which the procedure of final fabrication of successive self-locking screws is carried out.

A long strip 44 of round plastic stock for the inserts extends diagonally upward through the support structure 34. As best shown in Figs. 6 and 9, the strip 44 may extend slidingly across a transverse support bar 45 and may extend through an inclined guide bore or channel 46 in the front wall 48 of the rectangular support structure to emerge into the processing zone just above the seat 40. The angle of inclination of the feed strip 44 relative to the front face 35 of the rectangular support structure is the angle of the two previously mentioned taper surfaces 26 and 28 at the opposite ends of the installed insert 25.

A suitable blade 50 is adapted to reciprocate along the front face 35 across the end of the guide channel 46 to shear successive increments from the feed strip 44. It is apparent that both the front face 35 at the end of the guide channel 46 and the blade 50 cooperate in the manner of a pair of shears with the shearing action occurring in a plane at an angle of inclination relative to the strip 44 and, of course, relative to the groove 22 of the seated screw. A feature of the preferred practice of the invention is that the blade 50 also serves as an impact member to ram the severed insert increment or blank body 25a (Fig. 4) into the groove 22 of the screw. For this purpose, the blade 50 has at leading face 52 that is parallel to the axis of the feed strip and is also parallel to the axis of the recess or seat 40. In this particular practice of the invention, the leading face 52 of the blade A is of serrated configuration, being formed with small transverse ribs 53 (Fig. 7) for the purpose of stamping the previously mentioned indentations 32 into the insert body.

With a screw S positioned in the seat 40 with the groove of the screw uppermost, the feed strip 44 is advanced until a portion of the desired length extends into the processing zone. In this instance, the impact face 52 of the blade is of the desired length, the feed strip 44 being advanced until the end of the strip is flush with the outer face of the blade. The blade 50 is then moved downward to shear a blank 25a from the end of the feed strip and to carry the insert blank downward with sufficient impact force to seat the blank in the groove 22 and to deform the blank to the desired final configuration. The blade 50 may then be elevated to permit removal of the finished screw.

Any suitable means may be provided for actuation of the blade 50. In the present embodiment of the invention, for example, the apparatus includes an overhanging arm 54, as best shown in Fig. 6, that is fixed relative to the rectangular frame 34 and this arm provides a vertical guideway 55 in which a suitable rack bar 56 is slidingly mounted. The blade 50 is fixedly mounted on the lower end of the rack bar 56 by suitable screw means 58.

The teeth 60 of the rack bar 56 are engaged by a gear 62 on a rocker shaft 64 that is journalled in the overhanging arm 54. As shown in Fig. 12, the rocker shaft 64 is operated by a rocker arm 65 that is keyed thereto and the rocker arm, in turn, is operated by a suitable solenoid 66. In the construction shown, the solenoid 66 is pivotally mounted by a pin 68 on a fixed support bracket 70. The armature 72 of the solenoid has a rigid extension 74 that is operatively connected to the rocker arm 65 by pivot means 75.

It is apparent that energization of the solenoid 66 to retract the armature 72 pulls the rocker arm 65 down and that the solenoid pivots to follow the arcuate movement of the rocker arm. This actuating arrangement is advantageous because a solenoid inherently operates with sustained acceleration to favor high impact force at the end of the armature thrust. Thus, when the solenoid 66 is energized, the rack bar 56 moves the blade 50 downward with sufficient force to shear the feed strip 46 and to carry the insert blank into the screw groove 22 with sufficient impact to shape the blank to the desired configuration.

In the preferred practice of the invention, the incremental advance or intermittent feed movement of the plastic strip 44 and the downward movement of the blade 50 are carried out automatically in timed sequence to provide a predetermined operating cycle and the operating cycle further includes the automatic ejection of the finished screw. Preferably, the mechanism for this purpose includes a stationary gripper means, generally designated 76, for engagement with the feed strip 44 and a reciprocative gripper means, generally designated 78, together with suitable actuating means for reciprocating the gripper means 78 in timed relation to the energization of the solenoid 66.

The stationary gripper means 76 may comprise a suitable dog 80 in cooperation with the stationary support bar 45. The dog 80 which is in the form of a lever is fulcrumed on a pivot 82 and is formed with a downwardly extending pointed nose 84 for engagement with the feed strip 44. A suitable spring 85 tends to rotate the dog 80 clockwise as viewed in the drawings thereby to urge the nose 84 into effective engagement with the feed strip. It is apparent that the spring-pressed dog 80 will permit the feed strip 44 to be advanced freely upward since such movement of the feed strip tends to rotate the dog in a release direction. On the other hand, the dog prevents downward longitudinal retraction of the feed strip since such retraction tends to rotate the pointed nose of the dog into the feed strip.

The reciprocative gripper means 78 may include a slide block 86 that is slidingly mounted in a large rectangular recess 88 of the support structure 34, as shown in Fig. 10. The slide block 86 has a lateral shoulder 90 parallel with the feed strip 44 and also has a bore 94 through which the feed strip extends along the surface of the shoulder. A dog 95 having a pointed nose 96 is mounted on the side of the slide block 86 by a suitable pivot 98. A spring 100 having its upper end connected to the slide block 86 and its lower end connected to the dog 95 tends to rotate the dog into engagement with the feed strip 44. This second dog 95 functions in the same manner as the first dog 80 in that the dog freely permits upward movement or advance of the feed strip 44 relative to the slide block 86 but prevents relative movement of the feed strip in the opposite longitudinal direction.

The slide block 86 is reciprocated in the axial direction of the feed strip 44 by means of an actuating lever 102 that is best shown in Fig. 10. The actuating lever 102 extends through a rectangular opening 104 in the slide block 86 to control the slide block and further extends through an opening 105 in the support structure 34. The actuating lever 102 is fulcrumed by a pivot 108 on the outer end of a laterally extending arm 110 of the support structure. The upper side of the arm 110 presents a guide surface 112 for the actuating lever 102, which guide surface continues through the side wall opening 106 and is parallel with the inclined axis of the feed strip 44.

It is apparent that the actuating lever 102 may be oscillated about its pivot 108 to cause corresponding reciprocation of the slide block 86. On the upward forward movement of the slide block 86, the dog 95 cooperates with the lateral shoulder 90 of the guide block to engage the feed strip 44 and to cause the feed strip to be advanced into the processing zone. During this advance movement of the slide block 86, the feed strip slides past the pointed nose 84 of the dog 80. On the return movement of the slide block 86, the dog 80 prevents retraction of the feed strip 44, the pointed nose 96 of the dog 95 sliding freely back along the feed strip.

In the arrangement shown in Fig. 10, the actuating lever 102 is urged towards its retracted position by a suitable coiled spring 114. One end of the spring 114 hooks into an aperture 115 in the actuating lever and the other end hooks into an aperture 116 in a fixed transverse bar 118. The fixed bar 118 is mounted on the back of the support structure 34 by suitable screw means 120.

The actuating lever 102 is moved in the opposite direction by a rotary cam 122 in opposition to the spring 114 and for this purpose the outer end of the actuating lever has a crossbar 124 (Figs. 10 and 11) mounted thereon by suitable screw means 125. The actuating cam 122 is mounted on a drive shaft 126 and is fixed thereto by a suitable setscrew 128. The drive shaft 126 is connected to reduction gearing in a gear case 130, which gearing is driven by a suitable motor (not shown).

Also mounted on the drive shaft 126 is a second cam 132 which is secured in adjusted position by a suitable setscrew 134. This second cam 132 operates a normally open switch 135 (Fig. 11) which controls the circuit of the solenoid 66. It is apparent that when the cam 122 swings against the crossbar 124, as shown in Figs. 10 and 11, the actuating lever 102 swings forward against the opposition of the spring 114 and that the spring retracts the actuating lever as the cam 122 continues to rotate.

Preferably, the apparatus includes an ejector for the finished screw, which ejector is operated by the described mechanism. For this purpose, an ejector rod 136 may be fixedly mounted by one end on the slide block 86. The ejector rod 136 extends slidingly through a guide passage 138 that extends through the end wall 42 of the screw seat 40, as best shown in Fig. 7.

The operation of the apparatus may be understood from the foregoing description. The drive shaft 126 may be driven at a constant speed, for example, at approximately 5½ r.p.m. The successive slotted screws S may be placed in the seats 40 by hand, but preferably are fed to the seat automatically by suitable means well known to the art, the feeding means being synchronized with the rotation of the drive shaft 126.

With a screw S in the seat 40 and with a predetermined increment of the feed strip 46 advanced into the processing zone as shown in Fig. 6, the cam 132 on the drive shaft 126 swings against the operating arm 140 of the normally cloesd switch 135 and closes the switch to energize the solenoid 66 long enough to cause the solenoid to bring the blade 50 downward with the required force. The initial movement downward of the blade 50 shears the insert blank 25a from the feed strip 44 and the continued movement rams the blank into the screw groove 22 to seat the insert and at the same time to shape the insert to the desired multiple point interlocking configuration.

The switch 135 is then permitted to open by continued rotation of the cam 132 and then the other cam 122 rotates against the crossbar 124 to move the actuating lever forward with subsequent forward movement of the slide block 86. This forward movement of the slide block 86 thrusts the ejector rod 136 against the finished screw S to eject the screw from the seat 40. The advance of the slide block 86 also causes corresponding advance of the feed strip 44 into the operating zone in preparation for the subsequent operating cycle. It is apparent that each shearing action by the blade 50 forms a taper surface on one end of one insert blank 25a and at the same time forms a taper surface on the end of the next succeeding insert blank.

Our description in detail of our preferred practice of the invention will suggest to those skilled in the art various changes, substitutions and other departures from our disclosure that properly lie within the spirit and scope of the appended claims.

We claim:

1. An apparatus for mounting deformable inserts in a groove cutting across the turns of a screw thread of threaded fastening members to make the fastening members self-locking wherein an end of each said groove is tapered, comprising: means to seat a fastening member in a processing zone with the groove thereof exposed to receive an insert; means to support a strip of insert material generally longitudinally of the seated fastening member with an unsupported end portion of the strip positioned adjacent and generally parallel to the groove, severing means having a normal position adjacent said end portion of the strip on the side thereof away from said seating means, said severing means being movable toward said seating means along a path to engage the strip at an acute angle relative to the strip to sever said end portion of the strip at an angle to taper the end of said end portion of the strip, said movable severing means having a surface to contact the severed end portion along a line parallel to said groove and press the severed end portion into said groove into interlocking engagement with the ends of the screw thread adjacent the sides of the groove and with the formed tapered end of the severed end portion seated in and substantially filling said tapered end of the groove and the rear tapered end seated in said groove and substantially parallel to the tapered end of said groove.

2. An apparatus for mounting deformable inserts in a groove cutting across the turns of a screw thread of threaded fastening members to make the fastening members self-locking, wherein an end of each said groove is tapered, comprising: means to seat a fastening member in a processing zone with the groove thereof exposed to receive an insert; means to support a strip of insert material adjacent the seated fastening member in generally longitudinal alignment with said groove with an unsupported end portion of the strip positioned adjacent and parallel to the groove; severing means having a normal position adjacent said end portion of the strip on the side thereof away from said seating means, said severing means being movable linearly toward said seating means to sever said end portion of the strip and having a surface also parallel to said groove to contact the severed end portion and press the severed end portion into said groove, said means to support the strip positioning the strip at an acute angle to the direction of movement of said severing means whereby the strip is severed at an angle to result in the forward end of the severed strip having a tapered end to seat in and substantially fill said tapered end of the groove and with the rear end seated in said groove and substantially parallel to the tapered end of said groove.

3. A method of fabricating a series of self-locking screw-threaded fastening members with inserts therein, including the steps of: providing a generally longitudinal groove in each fastening member cutting across the turns of the screw thread thereof with an end of the groove tapered in depth; providing a strip of deformable insert material of slightly greater width than the groove; shearing off successive end portions of the strip at an acute angle to the longitudinal axis of the strip to produce successive inserts with each insert having a taper at one end and an opposite taper at the other end; and seating the successive severed portions of the strip in the grooves of the fastening members with a taper at one end of each severed portion of the strip conforming generally to the tapered end of the groove.

4. A method of fabricating a self-locking screw-threaded fastening member with an insert therein, including the steps of: providing a generally longitudinal groove in the fastening member cutting across the turns of the screw thread thereof to form gaps between cut ends of each screw thread turn, providing an elongated insert body of permanently deformable material of greater width than the width of said gaps; forcing said body into said groove past said cut ends of the screw thread turns at the side edges of the groove to gouge into the opposite sides of the insert body; and deforming said insert body under pressure applied radially of said fastening member to provide permanently deformed interlocking portions extending laterally of said groove between the ends of adjacent turns of the screw thread along the side edges of said groove.

5. A method of fabricating a self-locking screw-threaded fastening member having a chamfered leading end with an insert therein, including the steps of: providing a generally longitudinal groove in the fastening member cutting across the turns of the screw thread thereof with an end of the groove tapered in depth; providing an elongated insert body of permanently deformable material of greater width than said groove; forming said insert body with one end having a taper and an opposite taper at the other end thereof; seating said elongated insert body within said groove with the taper at one end of said body conforming generally to the tapered end of the groove and with the taper at the other end of said body lying within the chamfer of the leading end of the fastening member; and deforming said insert body under pressure applied radially of said fastening member to provide permanently deformed interlocking portions extending laterally of said groove between the ends of adjacent turns of the screw thread along the side edges of said groove.

6. A method of fabricating a series of self-locking screw-threaded fastening members with inserts therein, including the steps of: providing a generally longitudinal groove in each fastening member cutting across the turns of the screw thread thereof with an end of the groove tapered in depth; providing a strip of deformable insert material of slightly greater width than the groove; shearing off successive end portions of the strip at an acute angle to the longitudinal axis of the strip to produce successive inserts with each insert having a taper at one end and an opposite taper at the other end; seating the successive severed portions of the strip in the grooves of the fastening members with a taper at one end of each severed portion of the strip conforming generally to the tapered end of the groove; and deforming the successive severed portions under pressure while in the grooves of the fastening members to provide permanently deformed interlocking portions extending laterally between the ends of adjacent turns of the screw thread along the side edges of said grooves.

References Cited in the file of this patent

UNITED STATES PATENTS

| | | |
|---|---|---|
| 2,217,714 | Swanstrom | Oct. 15, 1940 |
| 2,409,638 | Lyon | Oct. 22, 1946 |
| 2,520,121 | Brutus | Aug. 29, 1950 |
| 2,754,117 | Ghormley | July 10, 1956 |
| 2,779,038 | MacBlane | Jan. 29, 1957 |
| 2,815,787 | Podell | Dec. 10, 1957 |